US011593090B2

(12) United States Patent
Cataniag et al.

(10) Patent No.: US 11,593,090 B2
(45) Date of Patent: Feb. 28, 2023

(54) SYSTEMS AND METHODS OF AUDITING SERVER PARAMETERS IN A TELEPHONY NETWORK

(71) Applicant: T-MOBILE USA, INC., Bellevue, WA (US)

(72) Inventors: Arnold Cataniag, Bellevue, WA (US); Madhuri Kotta, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 38 days.

(21) Appl. No.: 17/110,252

(22) Filed: Dec. 2, 2020

(65) Prior Publication Data
US 2022/0171610 A1 Jun. 2, 2022

(51) Int. Cl.
*G06F 9/44* (2018.01)
*G06F 8/65* (2018.01)
*H04L 67/00* (2022.01)

(52) U.S. Cl.
CPC ............... *G06F 8/65* (2013.01); *H04L 67/34* (2013.01)

(58) Field of Classification Search
CPC .................................. G06F 8/65; H04L 67/34

USPC ................................ 717/100–112, 168–178
See application file for complete search history.

(56) References Cited

U.S. PATENT DOCUMENTS 9,767,280 B2 * 9/2017 Takano ..................... G06F 8/65

* cited by examiner

*Primary Examiner* — Chuck O Kendall
(74) *Attorney, Agent, or Firm* — Marshall, Gerstein & Borun LLP (57) ABSTRACT

The current disclosure relates to a system and method for auditing application parameters in a communication network. In particular, the method includes retrieving a set of golden parameter master lists from an auditing database, where each golden parameter master list corresponds to an application of the telecommunications network, and where each golden parameter master list comprises a set of parameter values for the respective application. The method also includes selecting a list of one or more applications for auditing, and for each application in the list: selecting a corresponding golden parameter master list from the set of golden parameter master lists and comparing each of the parameter values of the golden parameter master list to a corresponding set of parameter values of the application to generate a set of discrepancies.

18 Claims, 4 Drawing Sheets

SYSTEMS AND METHODS OF AUDITING SERVER PARAMETERS IN A TELEPHONY NETWORK

FIELD OF THE DISCLOSURE

The present disclosure generally relates to systems and methods for automatically auditing parameters of one or more servers in a telephony network, and more particularly, for implementing a golden parameter master list to audit applications implemented by the one or more servers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Telephony communication networks have become an integral facet of modern society. These communication networks provide and facilitate the infrastructural backbone for a wide variety of communication platforms and information delivery systems. For example, telephony communication networks enable and support voice calls, video chatting, text messaging, e-mailing, media streaming, and other forms of information exchange. Accordingly, telephony communication networks allow people, regardless of physical location, to have access to information and communicate with others.

Typically, telephony communication networks employ a variety of servers running in various applications servers (AS's) to carry out functions of the network. For example, TAS (Telephony application servers) may deliver multimedia telephony (MMTEL) service to any clients of the network connected via Wi-Fi, 3G, LTE etc. Further, the telephony communication network may employ different types of application servers throughout the network. As changes are made to the network, the applications of one or more TASs must be updated to implement the change. If the applications are updated incorrectly, the error may affect the functionality of the entire telephony communication network.

SUMMARY

As described further herein, the disclosure generally relates to systems, methods, and non-transitory computer-readable media storing instructions for auditing application parameters in a telecommunications network. The method may include retrieving a set of golden parameter master lists from an auditing database, where each golden parameter master list corresponds to an application of the telecommunications network, and where each golden parameter master list comprises a set of parameter values for the respective application. The method may also include selecting a list of one or more applications for auditing, and, for each application in the list, performing an audit. The audit may include selecting a corresponding golden parameter master list from the set of golden parameter master lists and comparing each of the parameter values of the golden parameter master list to a corresponding set of parameter values of the application to generate a set of discrepancies.

The method may include displaying the set of discrepancies on a user-interface of a client device. Next, the method may include receiving, via the user-interface of the client device, a selection of a subset of discrepancies of the set of discrepancies, and, for each discrepancy of the subset of discrepancies, retaining the parameter value of the of the application. The method may also include changing the parameter value of the application to match the corresponding parameter value of the golden parameter master list.

In an embodiment the list of one or more applications for auditing is selected based on a geographic location and/or on a classification of a function type of the applications. In some embodiments, parameter values of the golden parameter master lists of the one or more applications correspond to parameter values prior to updates to the one or more applications and the parameter values of the one or more applications correspond to new parameter values following the updates to the one or more applications. In some embodiments, the applications of the telecommunications network are telecommunications applications running on Application Servers (ASs).

This summary is not comprehensive and is necessarily limited to certain aspects of the invention described herein. Additional or alternative components, aspects, functions, or actions may be included in various embodiments, as described further below.

DETAILED DESCRIPTION

The systems and methods of the current disclosure implements one or several techniques for automatically auditing Application Server (AS) applications in a network. In particular, one or more "golden parameter" master lists are created, where each list includes a number of verified parameters. Each golden parameter master list corresponds to a set of AS applications. During an audit, the system compares the parameters of one or more selected AS applications to the corresponding golden parameter master list to determine if a set of discrepancies exist. If necessary, the system then adjusts each parameter of each application that does not match the golden parameter master list.

Figure 1:
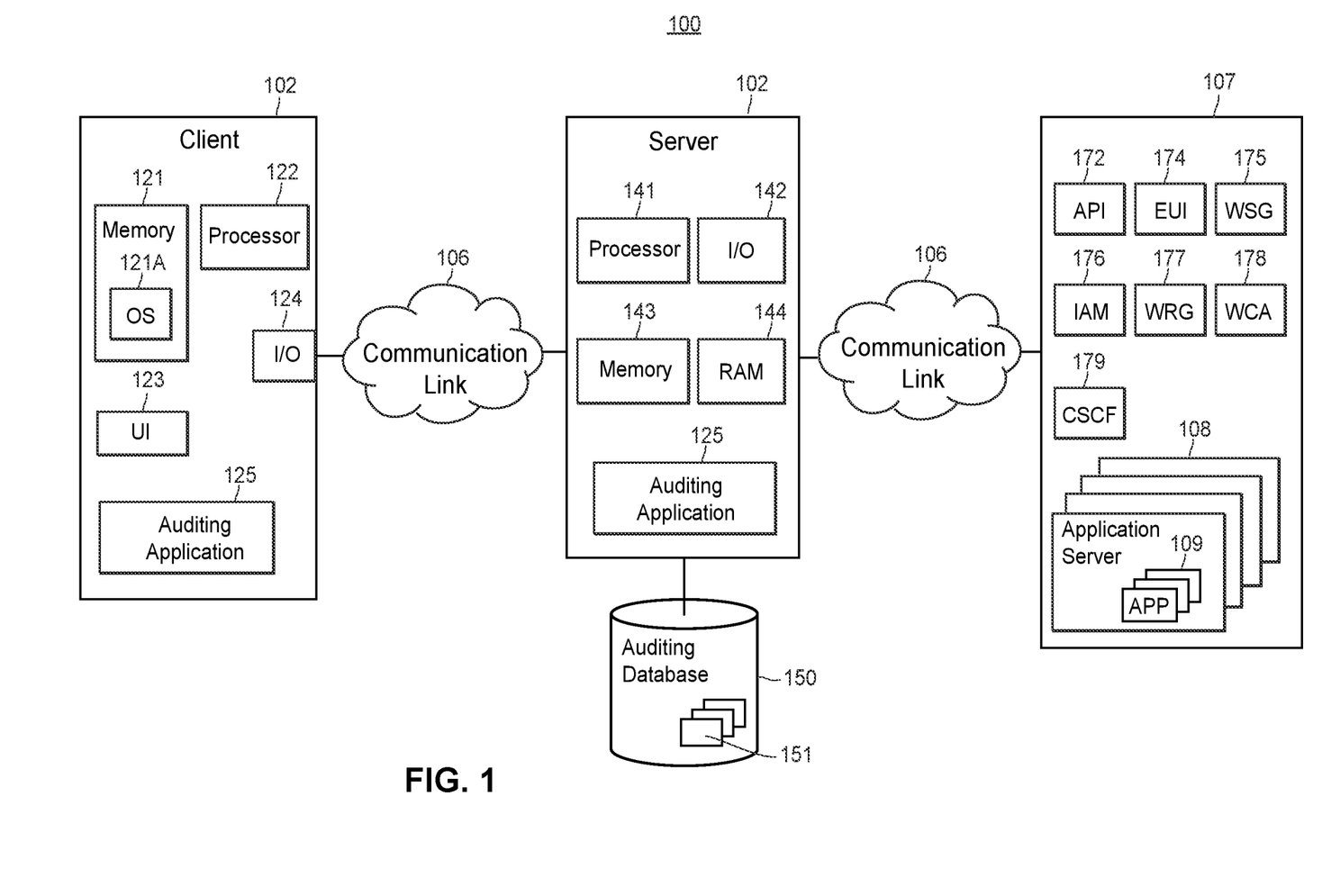
FIG. 1 illustrates an example system for data management according to the techniques disclosed herein.

An example computing environment in which the system of this disclosure can operate is discussed first with reference to FIG. 1, followed by a discussion of several example use cases and methods that can be implemented in the system. FIG. 1 illustrates a block diagram of an example system 100 in accordance with an exemplary embodiment of the present disclosure. The system 100 may implement the techniques outlined above and described in further detail below. The system 100 may include a client computing device 102, a server 104, a communication link 106, and a communication network 107. Although FIG. 1 only illustrates a single example of each device for simplicity, it should be understood that any suitable number of devices 102 and 104 may be included in the system 100.

FIG. 1 includes a client computing device 102 which may be, for example, a computer, a laptop, a smart device, a tablet, or any other suitable computing device. The computing environment 100 in general can include any suitable number of client computing devices 102 operating and communicatively coupled to the server 104 via a communication link 106. The client computing device 102 can include a memory 121, one or more processors 122, a network interface 124, a user interface (UI) 123, as well as an auditing application 125 for performing an audit of one or more applications 109 in the communication network 107 as described further below.

The memory 121 may be a non-transitory memory and may include an operating system 121A and one or several suitable memory modules, such as random-access memory (RAM), read-only memory (ROM), flash memory, other types of persistent memory, etc. The network interface 124 can support any suitable communication protocol to communicate with remote servers and other devices via the communication links 106. The UI 123 can include any suitable combination of input devices such as a touchscreen, a keyboard, a microphone, etc. and output devices such as screens, speakers, etc. The memory 121 stores an operating system (OS) 121A, which can be any type of suitable mobile or general-purpose operating system.

The system 100 further includes one or more servers 104 communicatively coupled to the client computing device 102 via communication link 106. The server 104 can receive data from the client computing device 102 and other client devices, and further retrieve data from auditing database 150. The computing environment 100 in general can include any suitable number of providers of content and/or databases as necessary to store and compile data. The server 104 and the client computing device 102 can communicate via a communication link 106, which may include a wide area network such as the internet, for example, and may include multiple wired and/or wireless communication links.

For simplicity, FIG. 1 illustrates the server 104 as only one instance of a server device. However, the server 104 according to some implementations includes a group of one or more server devices, each equipped with one or more processors and capable of operating independently of the other server devices. Server devices operating in such a group can process requests from the client computing device 102 individually (e.g., based on availability), in a distributed manner where one operation associated with processing a request is performed on one server device while another operation associated with processing the same request is performed on another server device, or according to any other suitable technique. For the purposes of this discussion, the term "server" may refer to an individual server device or to a group of two or more server devices.

With continued reference to FIG. 1, the server 104 includes one or more processors 141 a network interface 142 and a non-transitory memory 143 (e.g., a hard disk, a flash drive). The memory 143 may be a non-transitory memory and may include one or several suitable memory modules, such as random-access memory (RAM 144), read-only memory (ROM), flash memory, other types of persistent memory, etc. The network interface 142 may support any suitable communication protocol to communicate with remote servers and other devices via communication links 106. In an embodiment, the memory 143 may store instructions that implement network auditing via auditing application 125. The instructions that implement the auditing application 125 are executable on the one or more processors 141.

The server 104 can be communicatively coupled to one or more auditing databases 150 that store data that auditing application 125 can use to perform an audit on one or more applications 109 in a communication network 107. In particular, the auditing database 150 may store a set of golden parameter master lists 151. Each golden parameter master list 151 may contain a set of verified parameters corresponding to one or more applications 109 operating on one or more application servers (ASs) 108. The golden parameter master lists 151 may correspond to applications 109 in a particular geographic region or applications 109 relating to a particular function in the communication network, as discussed in greater detail below.

The auditing databases 150 may store private and/or publicly accessible data, or any combination of the two. In some embodiments, one or more auditing databases 150 may be protected by a firewall and/or other security measures. In these embodiments, the server 104 may be specially configured to access the data in the protected auditing databases 150. In general, the server 104 can access any suitable number of databases not pictured in FIG. 1.

The server 104 and/or client device 102 may be communicatively coupled to a communication network 107 including one or more application servers 108 including one or more applications 109. In an embodiment, the communication network 107 may be a proprietary communication network. The communication network 107 provides one or more network-native communication functionalities for telecommunications between user equipment, such as voice or video calls between users of the communication network 107. In some embodiments, the communication network 107 may be a telecommunications network providing voice and data communication between service subscribers having accounts with the operator of the communication network 107 (or with operators of interconnected communication networks). The communication network 107 includes a plurality of components to receive, send, process, generate, and route data between end users and among components of the communication network 107. Although only relevant components of the proprietary communication network 107 are illustrated, a person of ordinary skill in the art will understand additional components may be included to facilitate communication. Additionally, although illustrated as separate components, some or all of the components of the communication network 107 may be combined in various combinations in various embodiments.

In the some embodiments, the communication network 107 includes an API gateway 172, an Enterprise User Interface (EUI) 174, a web service gateway (WSG) 175, an Identity Access Management (IAM) 176, a WebRTC gateway (WRG) 177, a WebRTC communication adapter (WCA) 178, and a call session control function (CSCF) 179. The API gateway 172 is configured to provide access to the communication network 107 to the client device 102 and/or server 104, including serving as a pass-through gateway to the communication network 107 following authentication and registration. The EUI 174 is configured to authenticate user accounts associated with the proprietary communication network 140 based upon user credentials. The WSG 175 is configured to maintain and provide information regarding the status of service lines. The IAM 176 is configured to manage device access to the communication network 107, including providing access tokens and enforcing access policies. The WRG 177 is configured to connect the client device 102 and/or server 104 to the native functionalities of the proprietary communication network 107 via a WebRTC API in order to enable direct real-time audio, video, or other data channels between user devices. The WCA 178 is configured to adapt communication for the WRG 177 to establish communication connections and facilitate service line registration. The CSCF 179 is configured to process communication signals within an IP Multimedia Subsystem (IMS) of the communication network 107. These components of the communication network 107 may be accessed and used (directly or indirectly) to establish communication connections and implement network functionalities for network-native communications.

Among other components, the communication network 107 includes one or more application servers (AS's) 108 which include applications 109 to execute functions to facilitate operability of the communication network 107. Although the components of only one AS's 108 are illustrated in FIG. 1, various embodiments of the exemplary system 100 may include numerous examples of such components.

The AS 108 may be a server, like server 104, and include components that receive, process, produce, transmit, and store data. In some embodiments, the AS 108 may be a telephony application server, which carries out functions to help implement a telecommunication network. The AS 108 may include one or more applications 109 to implement one or more of the functions of the various components of the communication network 107 (e.g., the API gateway 172, the EUI 174, the WSG 175, the WRG 177, the WCA 178, or the CSCF 179) discussed elsewhere herein. The AS 108 also includes a communication interface 181 configured to send and receive electronic communication messages between the AS 108 and external computing devices (e.g., client devices 102 and server 104) via the communication link 106. In this manner, the server 104 and/or client device 102 may implement the auditing application 125 to communicate with and audit the AS 108, and more specifically to audit the one or more applications 109 of AS 108.

With continued reference to FIG. 1, the communication links 106 may be configured as any suitable wired and/or wireless network or direct communication connections configured to facilitate communications between one or more computing devices 102, server 104, communication network 107. For example, communication links 106 may couple one or more devices via one or more landline, Internet Service Provider (ISP) backbone connections, satellite links, public switched telephone networks (PSTNs), etc. To provide additional examples, communication links 106 may include portions of a proprietary network, a secure public internet, a mobile-based network, a virtual private network, etc. and may include any suitable number of interconnected network components that form an aggregate network system, such as dedicated access lines, plain ordinary telephone lines, satellite links, cellular base stations, a public switched telephone network (PSTN), etc., or any suitable combination thereof.

In some embodiments, communication links 106 may facilitate one or more computing devices 102 connecting to the Internet. In embodiments in which a communication link 106 facilitates a connection to the Internet, data communications may use one or more suitable Internet communication protocols. In various embodiments, communication links 106 may be implemented, for example, as a wireless telephony network (e.g., GSM, CDMA, LTE, etc.), a Wi-Fi network (e.g., via one or more IEEE 802.11 Standards), a WiMAX network, etc.

Server 104 may include one or more external computing devices, which may be implemented as any suitable number of components configured to store, receive, and or transmit data from one or more client computing devices 102 and/or auditing databases 150 via communication links 106 or any other suitable combination of wired and/or wireless links. In various embodiments, the server 104 may be configured to execute one or more applications, such as auditing application 125, to facilitate one or more aspects of the functionality used in accordance with one or more embodiments as discussed herein.

In various embodiments, the client computing device 102, the server, 104 and/or auditing databases 150 may store and/or access secure data that is of a private, proprietary, and/or sensitive nature. As a result, various embodiments of server 104, communication links 106, and/or one or more computing devices 102 may implement appropriate security protocols such as encryption, secure links, network authentication, firewalls, etc., to appropriately protect and secure such data.

Figure 2:
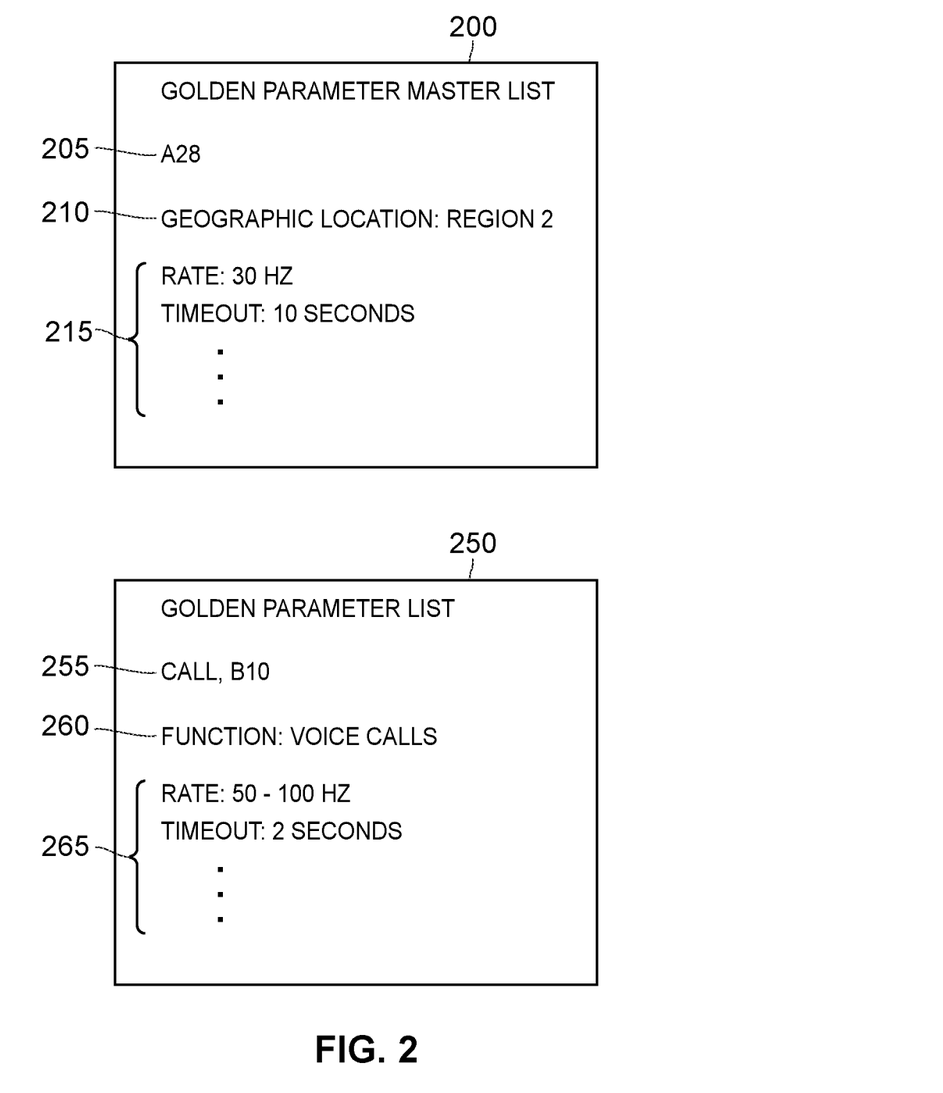
FIG. 2 illustrates an example method for generating output tables based on inputs in a predefined format.

FIG. 2 illustrates example golden parameter master lists 200 and 250. In FIG. 2, example golden parameter master list 200 illustrates an example list corresponding to a geographic location 210. As communication networks are usually very large and extend over large areas of land, updates may sometimes be performed piecewise through each geographic location until the entire communication network is updated. Thus, golden parameter master lists 200 may be created for specific geographic locations, where the geographic locations may correspond to existing geographic boundaries (i.e., cities, states, countries) or geographic locations that are created specifically for the communication network. Further, as there may be multiple golden parameter master lists 200 that correspond to the geographic location 210, the golden parameter master list 200 may also contain identifying information such as a name 205.

Further, golden parameter master list 200 also includes a number of parameters 215. The parameters 215 of the golden parameter master list 200 correspond to values that are known to be correct, and thus can be used for auditing. In an embodiment, a golden parameter master list 200 may contain a parameter value for each parameter 215 included in a corresponding application. Thus, when an audit is performed, each parameter of the application may be checked for accuracy. In another embodiment, a golden parameter master list may only contain a subset of parameters 215 (e.g., the parameters that must be set to a particular value), compared to the total number of parameters included in a corresponding application. In some embodiments, the golden parameter master list may contain multiple values for a single parameter 215 and/or a range of values for the parameter 215. In other embodiments, each parameter 215 of the golden parameter master list 200 must be set to a single value.

Golden parameter master list 250 is similar to golden parameter master list 200, although golden parameter master list 250 corresponds to applications with a particular function 260. Communication networks may have various application types that perform various functions in the communication network. Examples of functions include voice calls, video calls, data transmission, text transmission, etc. Further, one or more functions may each be included in certain classifications of functions. For example, voice and video calls may both be included in a "call" classification.

Like golden parameter master list 200, golden parameter master list 250 also has a name 255, and a number of parameters 265. In some embodiments the name 255 may include a version number and/or some other identifying information indicating that it is the most recent list and should thus be used for auditing. The name 265 may provide further information regarding the function 260, such as a classification. The parameters 265 of golden parameter master list 250 may be similar to the parameters 215 described above.

Golden parameter master lists 200 and 250 are simple examples presented for illustrative purposes. In practice, a golden parameter master list may contain hundreds or thousands of parameters used for auditing applications. Further, any number of golden parameter master lists may be employed by the system to audit applications. Golden parameter master lists may be configured for different uses. For example, a golden parameter master list may be configured to audit a single particular application, while other golden parameter master lists may be configured to audit sets of applications. Further, golden parameter master lists may be configured to audit applications based on any number and/or combination of identifying factors such as geographic location, application function, size, etc.

Figure 3:
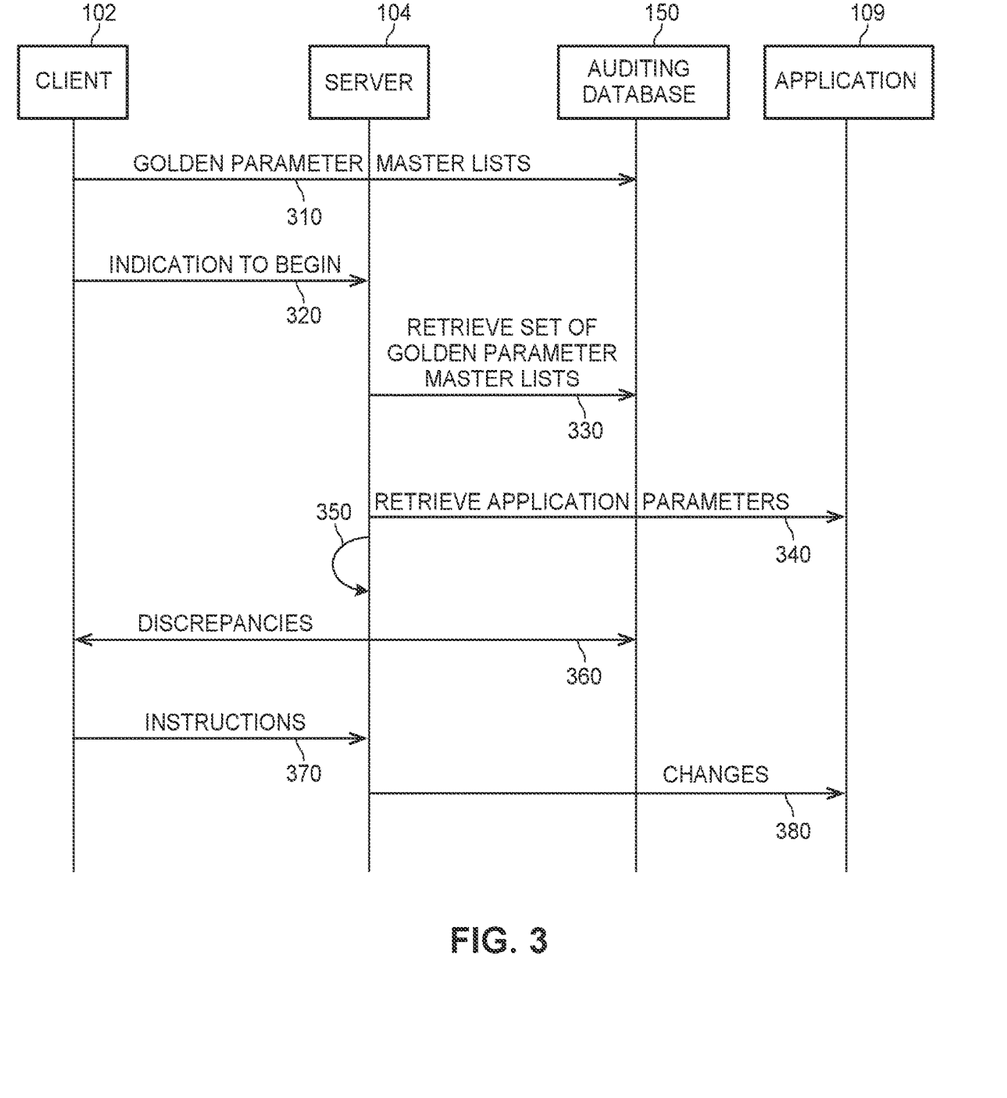
FIG. 3 illustrates an example user-interface for receiving input data in a predefined format of an input table.

FIG. 3 illustrates a sequence diagram 300 for auditing an application using a golden parameter master list, which may be performed by system 100 of FIG. 1, for example. For illustrative purposes, the components of the sequence diagram are discussed based on example components of the system 100 of FIG. 1. The sequence may start when a client computing device 102 transmits one or more golden parameter master lists to the auditing database 150 (step 310). For example, one or more updates may be performed on a communication network including one or more applications 109. One or more golden parameter master lists may be created based on the update or on the known proper configuration of the network prior to the update, and each golden parameter master list may include one or more parameter values that are known to be correct. Thus, as each application is updated to reflect the changes, an audit may be performed using the corresponding golden parameter master list to ensure that the application has been updated correctly.

The client computing device 102 may then send an indication to the server 104 to begin an audit (step 320). In some embodiments, the indication to begin an audit may also include a list of applications to be audited, as well as a set of golden parameter master lists to use for the audit. For example, such indication may be sent following an update to an application 109, which may be audited based upon a golden parameter master template stored in the auditing database 150 prior to the update. The indication may indicate that applications of a certain geographic region are to be included in the audit and/or that applications that include a classification of a certain function type are to be included in the audit. For example, the indication may indicate that voice call applications in Chicago are to be audited.

The server 104 may then retrieve a set of golden parameter master lists from auditing database 150 (step 330). The one or more retrieved golden parameter master lists may be identified based upon the indication received from the client computing device 102. The server may also retrieve application parameters from one or more applications 109 (step 340). In some embodiments, the retrieved parameters may be limited to the parameters included in the retrieved golden parameter master lists. For each application, the server 104 may determine an appropriate golden parameter master list and compare the parameter values of the application to the parameter values of the corresponding parameters of the golden parameter master list (step 350).

The server may then send a list of discrepancies to client computing device 102 and/or auditing database 150 (step 360). Such lists may be sent substantially concurrently or in any order via one or more messages. Further, a list of discrepancies may be sent to one or more databases for storage.

In some embodiments, the client computing device 102 may send instructions to the server 104 indicating how to handle discrepancies (step 370). For example, the instructions may indicate that discrepancies should be ignored or that discrepancies should be corrected such that the parameter values of the application are changed to match the parameter values of the corresponding parameter of the golden parameter master list. In some embodiments the instructions may indicate whether to ignore or correct each discrepancy in the list of discrepancies. In some embodiments, the instructions may indicate retaining the parameter value of a discrepancy in the application and/or changing the parameter value in the golden parameter master to match the parameter value of the application. In other embodiments, the instructions may indicate leaving both parameter values as is (i.e., retaining the parameter value in the golden parameter master list and the parameter value in the application).

If changes are to be made, the server 104 may change the values of one or more parameters of the application 109 and/or golden parameter master list (step 380). Steps 350-380 may be repeated as many times as necessary in order to complete the audit of each application in the application list.

The sequence diagram 300 is presented for illustrative purposes and is not intended to be limiting. For example, server 104 may perform some of the actions indicated as being performed by the client computing device 102, and vice versa. Further, actions indicated as being performed by a single component may be performed by multiple components of the system. The sequence diagram 300 is not intended to represent a rigid sequence of events, and any of steps 310-390 may be performed in any appropriate order and some steps may be performed multiple times.

Figure 4:
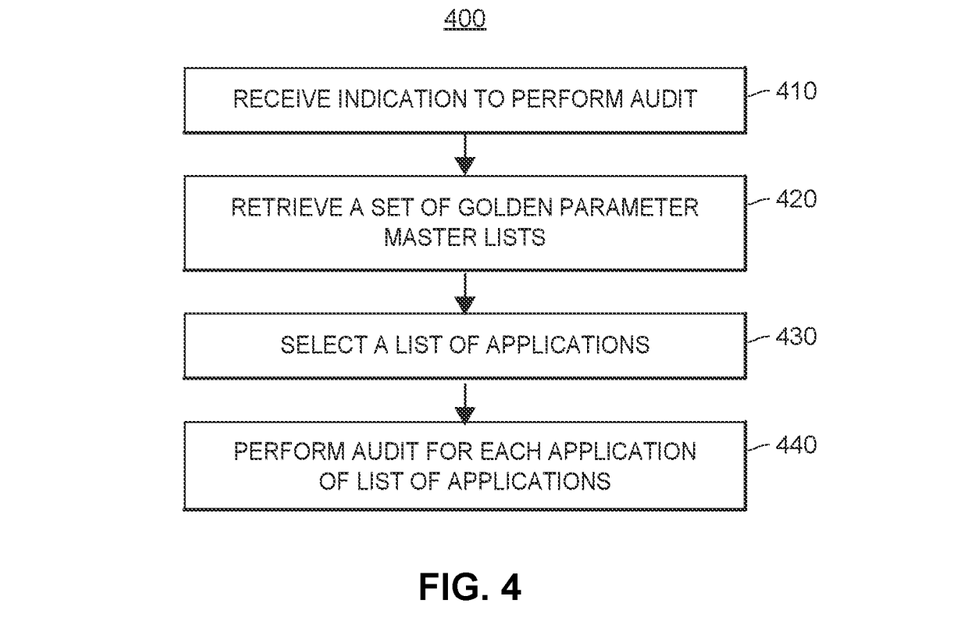
FIG. 4 illustrates an example user-interface for receiving input data from a user.

FIG. 4 illustrates a flow diagram of an exemplary method 400 for auditing applications in a communication network using a golden parameter master list. The method 400 may be implemented, as described above, by communicatively coupled components of the system 100 as illustrated in FIG. 1. However, in some embodiments, the method 400 may be performed in whole by the server 104. In other embodiments, the method 400 may be performed in any suitable combination of components of the system 100.

The method 400 may begin by receiving an indication to perform an audit (block 402). The indication may be received, for example, via a user-input through a user-interface of a client device. In another embodiment, audits may be performed periodically, and thus the indication to perform the audit may be received via a signal from a computing device. In some embodiments, an indication to perform an audit may be received automatically whenever a change is made to the golden parameter master lists stored on the database. In this embodiment, uploading new data to the auditing database may trigger an indication to perform and audit. The indication to perform an audit may indicate which applications are to be audited and/or which golden parameter master lists are to be used to perform the audit. In further embodiments, an indication to perform an audit may be generated automatically whenever an application is updated, in which case any golden parameter master lists associated with the updated application may be used to perform the audit.

Upon receiving an indication to perform an audit, the system may then retrieve a set of golden parameter master lists (block 404). The system may retrieve the set of golden parameter master lists from one or more databases and/or one or more front end devices. As described above, each golden parameter master list may correspond to one or more applications, and each golden parameter master list may correspond to applications with specific functions and/or applications in specific geographic regions. The system may then select a subset of the set of golden parameter master lists to use when performing an audit based on the applications to be audited.

The system may then select a list of applications to be audited (block 406). The system may select applications based on the indication of the audit and/or based on the golden parameter master lists. Though the system of the present disclosure is primarily focused on auditing applications on application servers in a communication network, in some embodiments the system may be configured to audit any applications related to the functionality of the communication network. Once the system selects one or more applications for auditing, the system may then perform the audit (Block 408).

The system may audit each application from the list of applications. To perform the audit, the system may determine an appropriate golden parameter master list for each application. The system may then compare the parameters of each application to the corresponding parameters of the appropriate golden parameter master list. The system may then store any discrepancies between the application parameters and the golden parameter master list. In an embodiment, the system may then display the discrepancies at a user-interface of a client device. The system may then receive a selection of one or more discrepancies to save, ignore, and/or correct. For example, a user may indicate that one or more discrepancies should be corrected and for those discrepancies the parameters of the application will be changed to match the corresponding parameters of the golden parameter master list.

In an embodiment, the system may automatically correct any discrepancies between the application parameters and the corresponding parameters of the appropriate golden parameter master list, such that the application parameters are changed to match the parameters of the golden parameter master list. The system may continue with the auditing process for each application from the application list. In some such embodiments, multiple iterations of audits may be performed to ensure the automatic correction of application parameters are consistent with all applicable golden parameter master lists used in the audit. When automatic correction of the application parameters fails to eliminate all discrepancies, an error report may be sent to a user of a client device for further analysis. Thus, the method 400 may enable the system to automatically correct configuration errors in some instances.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

The embodiments described above may be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly, impliedly, or inherently set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Further, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be any of X, Y, or Z, or any combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A computer-implemented method for auditing application parameters in a telecommunications network, the method comprising:
retrieving, by one or more processors of a server, a set of golden parameter master lists from an auditing database, where each golden parameter master list corresponds to an application of the telecommunications network, and where each golden parameter master list comprises a set of parameter values for the respective application;
selecting, by the one or more processors, a list of one or more applications running on one or more Application Servers within the telecommunications network for auditing; and
for each application in the list:
selecting, by the one or more processors, a corresponding golden parameter master list from the set of golden parameter master lists,
obtaining, by the one or more processors from the one or more Application Servers within the telecommunications network, a set of parameter values of the application as configured at each of the one or more Application Servers, and
comparing, by the one or more processors, each of the parameter values of the golden parameter master list to each corresponding set of parameter values of the application as configured at the respective Application Server to generate a set of discrepancies indicating misconfigured values for one or more parameters of the application.

2. The computer-implemented method of claim 1, wherein the list of one or more applications for auditing is selected based on a geographic location.

3. The computer-implemented method of claim 1, wherein the list of one or more applications for auditing is selected based on a classification of a function type of the applications.

4. The computer-implemented method of claim 1, further comprising:
displaying, via a user-interface of a client device, the set of discrepancies.

5. The computer-implemented method of claim 1, further comprising:
receiving, via the user-interface of the client device, a selection of a subset of discrepancies of the set of discrepancies; and
for each discrepancy of the subset of discrepancies:
retaining the parameter value of the of the application.

6. The computer-implemented method of claim 1, further comprising:
for each discrepancy of the set of discrepancies:
changing the parameter value of the application to match the corresponding parameter value of the golden parameter master list.

7. The computer-implemented method of claim 1, wherein:
parameter values of the golden parameter master lists of the one or more applications correspond to parameter values prior to updates to the one or more applications; and
the parameter values of the one or more applications correspond to new parameter values following the updates to the one or more applications.

8. A system for auditing application parameters in a telecommunications network, the system comprising:
an auditing database to store a set of golden parameter master lists,
one or more non-transitory storage media configured to store processor executable instructions, and
one or more processors operatively connected to the one or more non-transitory storage media and configured to execute the processor executable instructions to cause the system to:
retrieve the set of golden parameter master lists from the auditing database, where each golden parameter master list corresponds to an application of the telecommunications network, and where each golden parameter master list comprises a set of parameter values for the respective application;
select a list of one or more applications running on one or more Application Servers within the telecommunications network for auditing; and
for each application in the list:
select a corresponding golden parameter master list from the set of golden parameter master lists,
obtain a set of parameter values of the application as configured at each of the one or more Application Servers from the one or more Application Servers within the telecommunications network, and
compare each of the parameter values of the golden parameter master list to each corresponding set of parameter values of the application as configured at the respective Application Server to generate a set of discrepancies indicating misconfigured values for one or more parameters of the application.

9. The system of claim 8, wherein the list of one or more applications for auditing is selected based on a geographic location.

10. The system of claim 8, wherein the list of one or more applications for auditing is selected based on a classification of a function type of the applications.

11. The system of claim 8, wherein the instructions further cause the system to:
cause a user-interface of a client device to display the set of discrepancies.

12. The system of claim 11, wherein the instructions further cause the system to:
receive, from the client device, a selection of a subset of discrepancies of the set of discrepancies indicated by a user of the client device via the user-interface; and
for each discrepancy of the subset of discrepancies:
retain the parameter value of the of the application.

13. The system of claim 8, wherein the instructions further cause the system to:
for each discrepancy of the set of discrepancies:
change the parameter value of the application to match the corresponding parameter value of the golden parameter master list.

14. The system of claim 8, wherein:
parameter values of the golden parameter master lists of the one or more applications correspond to parameter values prior to updates to the one or more applications; and the parameter values of the one or more applications correspond to new parameter values following the updates to the one or more applications.

15. A tangible non-transitory computer-readable medium storing processor executable instructions that, when executed by one or more processors of a system, cause the system to:

retrieve the set of golden parameter master lists from the auditing database, where each golden parameter master list corresponds to an application of the telecommunications network, and where each golden parameter master list comprises a set of parameter values for the respective application;

select a list of one or more applications running on one or more Application Servers within the telecommunications network for auditing; and for each application in the list:
select a corresponding golden parameter master list from the set of golden parameter master lists,
obtain a set of parameter values of the application as configured at each of the one or more Application Servers from the one or more Application Servers within the telecommunications network, and
compare each of the parameter values of the golden parameter master list to a corresponding set of parameter values of the application as configured at the respective Application Server to generate a set of discrepancies indicating misconfigured values for one or more parameters of the application.

16. The tangible non-transitory computer-readable medium of claim 15, wherein the list of one or more applications for auditing is selected based on a geographic location.

17. The tangible non-transitory computer-readable medium of claim 15, wherein the instructions further cause the system to:
display, via a user-interface of a client device, the set of discrepancies.

18. The tangible non-transitory computer-readable medium of claim 17, wherein the instructions further cause the system to:
receive, via the user-interface of the client device, a selection of a subset of discrepancies of the set of discrepancies; and
for each discrepancy of the subset of discrepancies:
retain the parameter value of the of the application.

* * * * *